United States Patent Office 3,246,163
Patented Apr. 12, 1966

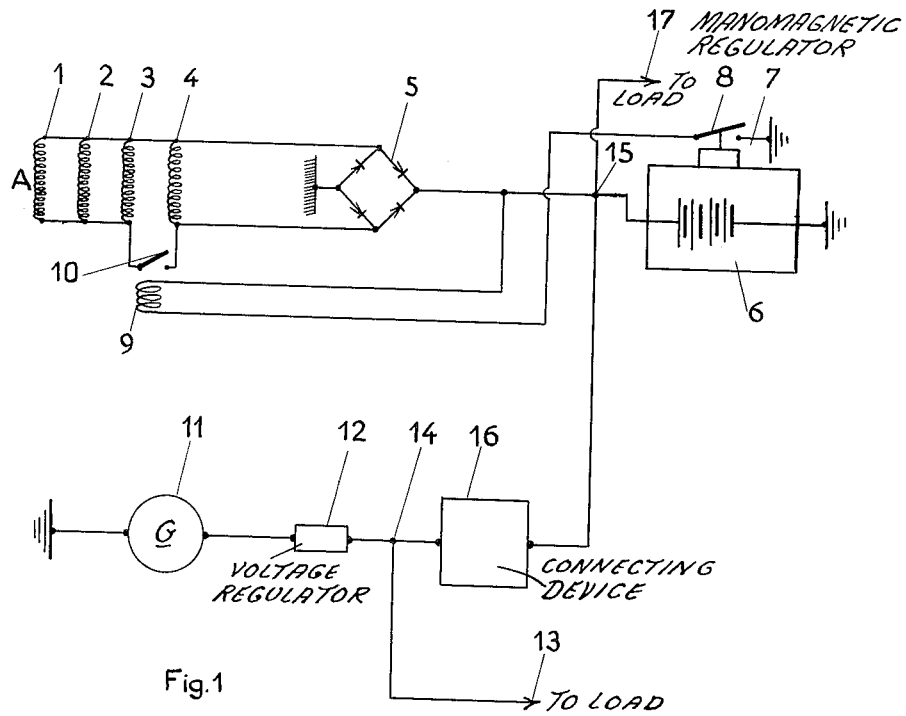
Fig. 1
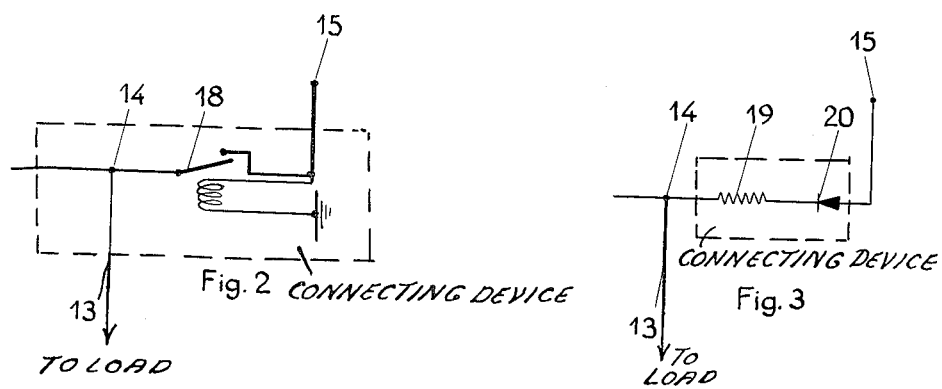
Fig. 2 CONNECTING DEVICE
Fig. 3 CONNECTING DEVICE
INVENTOR
ROBERT ROWE
BY Paul M. Craig, Jr.
ATTORNEY

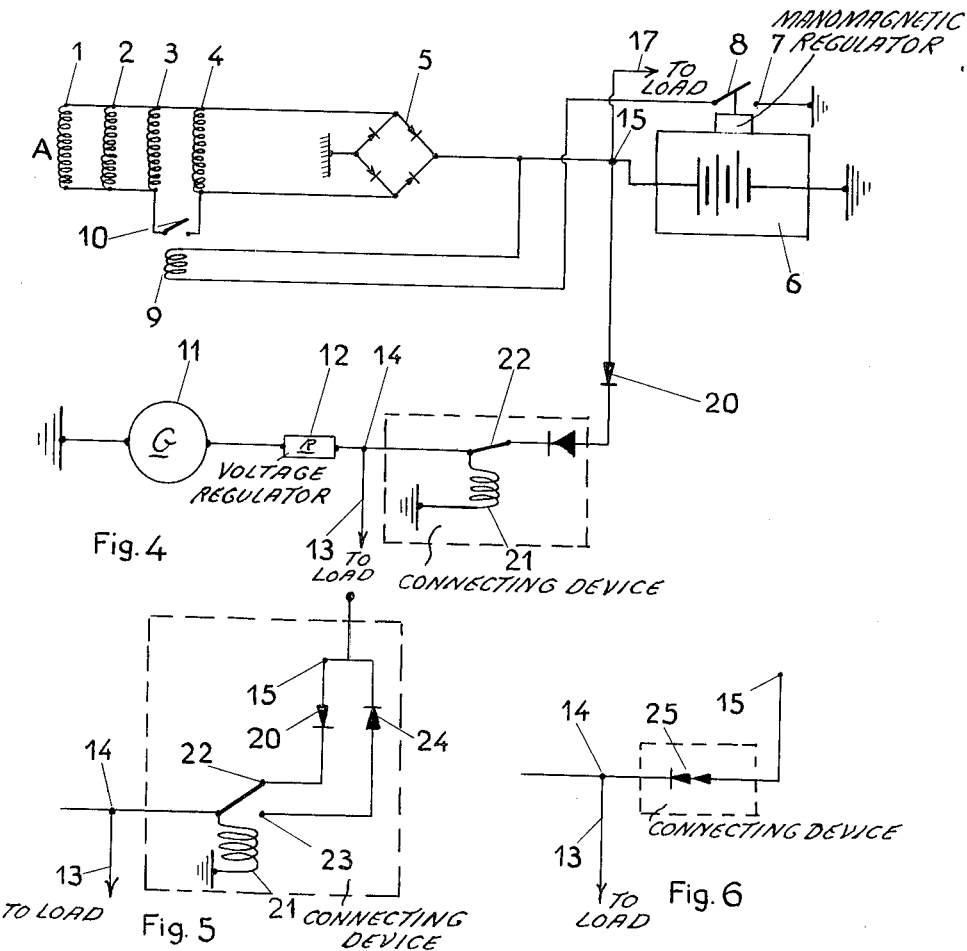
Fig. 4
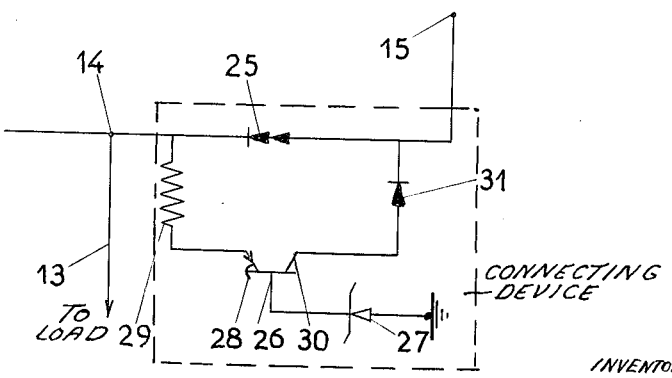
Fig. 5
Fig. 6
Fig. 7

3,246,163
ELECTRIC CURRENT-GENERATING INSTALLATION
Robert Rowe, Paris, France, assignor to Societe de l'Accumulateur Fulmen, Clichy, France, a French corporation
Filed Mar. 23, 1962, Ser. No. 182,065
Claims priority, application France, Mar. 31, 1961, 857,504; Mar. 2, 1962, 889,836
20 Claims. (Cl. 307—29)

The present invention relates to an electric current-generating installation comprising a battery.

In electric installations comprising a generator and a battery, and more especially in the electric equipment of vehicles, the battery is used for two purposes: on the one hand, the operation of the installation when the generator is stopped and especially the starting of the heat engine of the installation, and on the other hand the definition of the rated voltage of the installation and the regulation of the real voltage. The purpose of the voltage regulation is both to limit the voltage differences in the installation and to permit charging of the battery without overcharging it.

Generally speaking, the voltage is the same across the terminals of the generator, of the battery and of the loads.

In some cases, it has been proposed, more especially by the applicants, to protect some circuits by a resistance. In other cases, it has been proposed that the voltage of the generator when it is feeding into the installation should be higher than the voltage of the battery, since the battery is itself protected by a resistance.

The latter arrangement is not suitable in countries where the voltage of the loads is limited to a value which the voltage of the battery tends to exceed. In any case, it does not take account of the fact that in some cases, and especially in very cold weather, the voltage of the battery tends to exceed every admissible value in the installation, even at the very commencement of the charging.

The proposal that the voltage of the battery should be limited by the operating exigences of the installation, that is, to limit voltage deviations or fluctuations disturbing to the installation and that at the same time the battery should be well charged, which requires that the voltage should be able to reach the necessary values, is lacking in logic in all cases, and is fallacious in extreme cases.

The present invention has for its object to obviate the aforesaid disadvantages by departing radically from the generally accepted notions, and provides, on the one hand, for the regulation of the voltage in the installation and, on the other hand, for the regulation of the charging current of the battery to optimum values regardless of the voltage to which the battery adjusts itself, as a function of its condition, of its state of charge and of the temperature.

The subject of the invention is characterised by the fact that the installation comprises a generator which is capable of supplying, on the one hand, a current at variable voltage feeding one part of the installation, and on the other hand, a current at constant voltage feeding another part of the installation, a device being provided for connecting the variable-voltage circuits to the constant-voltage circuits.

The variable-voltage current permits recharging of the battery with the aid of a regulating system independent of the voltage, more particularly by a manomagnetic regulator, under optimum conditions in regard to rapidity and reliability. The constant-voltage current supplies one part of the installation, notably the lighting circuits.

The features of the invention will be clearly apparent from the following description thereof with reference to the figures of the accompanying drawings, which show by way of non-limiting example a number of embodiments.

FIGURE 1 is a circuit diagram of an installation according to the invention,
FIGURE 2 illustrates a constructional example of the connecting device,
FIGURE 3 illustrates a modified form of the connecting device,
FIGURE 4 illustrates a constructional form of an installation according to the invention, and
FIGURES 5 and 7 illustrate other constructional forms of the connecting device.

These figures relate to the electric equipment of a vehicle, but the principles illustrated are applicable to any equipment comprising a generator and a battery.

For the convenience of the explanation, the illustrated diagram comprises two separate generators. In practice, the two generators will normally be combined in a conventional single unit having, for example, two separate rotors and stators provided with a common shaft and a common prime mover as is conventional.

The generators may be direct-current or alternating-current generators which are either electromagnetically excited or excited by means of permanent magnets.

In the diagram of FIGURE 1, an alternator A comprising permanent magnets having four windings 1, 2, 3, 4, feeds through a rectifier 5 a battery 6 provided with a manomagnetic regulator 7. The operation of the manomagnetic regulator 7 is well known per se: as long as the gaseous discharge of the battery 6 is slight, the switch 10 of the relay 9 is closed since the switch 8 is opened and the charging current is maximum, for example, the charging current is I due to the fact that the windings 1, 2 and 3 are connected in parallel with the winding 4. When the gaseous discharge of the battery 6 exceeds a certain value, then the manomagnetic regulator 7 actuates the switch 8 in such a manner as to close the same thereby closing the energizing circuit of the relay 9 which actuates the switch 10 to open the same. The circuit connecting the winding 4 with the windings 1, 2, 3 is then opened and the charging current of the battery drops to a value, for example, to a value $i$ that is lower than the value I. Since manomagnetic regulators of this type are well known, per se, in the prior art, a detailed description thereof is dispensed with herein.

A dynamo 11 accompanied by a voltage regulator comprising a circuit breaker 12 applies constant voltage to the load circuit 13 connected to the point 14, which circuit comprises more especially the lighting equipment. A connecting device 16 is provided between the point 15 at which the current is fed into the battery 6 and the point 14 from which the load circuit 13 extends. There may be connected to the point 15 a load circuit 17 comprising more especially the starter.

The arrangement hereinbefore described operates as follows: the alternator A supplies to the battery 6 a charging current I or $i$, depending upon the position of the contact 8 whereby the position of the switch or contact 8 is controlled by the manomagnetic regulator 7 which itself is responsive or sensitive to the pressure of the discharged gases during the charge of the battery. The dynamo 11 supplies to the load circuit 13 a current at a predetermined constant voltage.

When the voltage at the point 14 tends to fall below the predetermined voltage for any reason, such as stoppage of the vehicle or excessive supply through the circuit 13, and if the voltage at the point 15 is higher than the voltage at the point 14, the connecting device 16 allows a boost current, supplied by the alternator A or by the battery 6 or by both, to flow from 15 to 14.

When the voltage at the point 14 is equal to the predetermined voltage, the connecting device 16 breaks the circuit between 14 and 15 and allows the free battery to exceed this voltage without influencing the load circuit 13.

If the voltage at the point 15 is lower than the voltage at the point 14, it may be arranged that either the connecting device allows a current to pass from 14 to 15 or, conversely, that no current can flow from 14 to 15 in any circumstances.

The connecting device may be constructed in various forms, some of which will hereinafter be indicated by way of non-limiting example.

FIGURE 2 illustrates a connecting device consisting of a voltage relay 18. This relay 18 opens when the voltage at the point 15 tends to exceed the predetermined constant voltage, which results in exactly the same form of operation of the device as has been described in the foregoing.

FIGURE 3 illustrates a connecting device comprising in series a resistance 19 and a diode 20. The diode prevents the return of current from 14 to 15. The resistance limits the current when the voltage 15 is higher than the voltage at 14. The resistance may vary, for example, as a function of the voltages.

The voltage relay of FIGURE 2 may be associated and combined with the diode of FIGURE 3.

Use may be made of a controlled diode, optionally associated with a voltage relay or a fixed or variable resistance, or with a power transistor.

In the diagram of FIGURE 4, an alternator A comprising permanent magnets having four windings 1, 2, 3, 4 feeds through a rectifier 5 a battery 6 provided with a manomagnetic regulator, of which the switch 8 controls a relay 9, whose switch 10 places in circuit all the windings of the alternator or the winding 4 only. The position of the switch 10 is therefore controlled by the manomagnetic detector 7 which is sensitive to the pressure of the gases discharged on the inside of the battery 6.

A dynamo 11, accompanied by a voltage regulator 12 comprising a circuit breaker applies constant voltage to the load circuit 13 connected to the point 14, which circuit comprises more especially the lighting equipment. Disposed between the point 15 at which current is fed into the battery 6 and the point 14 from which the load circuit 13 extends is a connecting device consisting of a diode 20 and a normally closed voltage relay 21, of which the armature closes, when in the released position or the energized condition, a contact 22.

The arrangement hereinbefore described operates as follows: the alternator A supplies to the battery 6 a charging current I of i, depending upon the position of the contact 8, the position of the switch 8 being controlled by a manomagnetic detector 7 responsive to the pressure of the gases discharged on the inside of the battery 6. The dynamo 11 supplies to the load circuit 13 a current at a predetermined constant voltage.

When the voltage at the point 14 tends to fall below the predetermined voltage for any reason, such as stoppage of the vehicle or excessive feed through the circuit 13, for example, the relay 21 ceases to attract the armature and the contact 22 closes. If the voltage at the point 15 is higher than the voltage at the point 14, the connecting device allows a boost current, supplied by the alternator A or by the battery 6 or by both, to flow from 15 to 14. This is the case more especially when the vehicle is stationary and the battery alone has to feed the whole equipment.

When the voltage at the point 14 is equal to the predetermined voltage, the relay 21 breaks the circuit between 14 and 15, thus allowing the free battery to exceed this voltage without influencing the load circuit 13.

FIGURE 5 illustrates a connecting device comprising, like that of FIGURE 4, a diode 20, a relay 21 and a contact 22. There is added thereto a contact 23 of the relay 21, which closes when the armature of the relay 21 is attracted, and a diode 24 connected between the point 15 and the contact 23, and of opposite direction to the diode 20.

When the voltage of the point 14 is lower than the predetermined voltage, the operation is the same as that described with reference to FIGURE 4. When the voltage is equal to or higher than the predetermined voltage, the armature is attracted and the contact 23 is closed. If the voltage at the point 14 is then higher than the voltage at the point 15, a current can flow from 14 to 15 through the diode 24, and it is thus possible more especially to supply a charging current to the battery in the event of breakdown of the generator A.

FIGURE 6 illustrates a device in which the diode and the armature of the relay are replaced by a number of series-connected diodes 25 (two in the case of the figure). The characteristic curve of the direct current of a diode is initially very close to zero. It may be stated with close approximation that it produces a voltage drop and that the current is substantially proportional to the difference between the voltage across the terminals of the diode and the said voltage drop. In this device, current is allowed to flow from 15 to 14 without precisely limiting the voltage at the point 14.

The device illustrated in FIGURE 7 is the same as that of FIGURE 6 with the addition of a device permitting the flow of current from 14 to 15, which gives an operation similar to that of FIGURE 2. This device comprises a PNP transistor 26 whose base is connected to ground through a Zener diode 27. The emitter 28 is connected to the point 14 through a resistance 29, and the collector 20 is connected to the point 15 through a diode 31. When the voltage at the point 14 is higher than the breakdown voltage of the diode 27, a current flows from 14 to 27 and to ground, and the transistor is thus triggered. If the voltage at 15 is lower than the voltage at 14, a current flows from 14 to 15 through the resistance 29, the emitter 28, the collector 30 and the diode 31.

It is possible without departing from the scope of the invention to cause to flow through the armature of the relay 21 only an auxiliary current which in turn serves to control an appropriate device which closes or opens the main circuit.

Instead of a PNP transistor, a NPN transistor may be employed, in which case the polarities will be reversed.

I claim:

1. A direct current generating installation which includes a battery having battery terminals, an alternating current generator operable to provide a variable-voltage current and a direct current generator, comprising two sets of output terminals, a first utilization circuit with variable voltage and a second utilization circuit with predetermined substantially constant voltage operatively connected, respectively, to the first set and second set of output terminals, said first utilization circuit being also operatively connected across the battery terminals, said battery being operatively connected with said alternating current generator by way of a rectifier, said second utilization circuit being operatively connected to said direct current generator by way of a voltage regulator, and the terminals of the same polarity of said two utilization circuits being operatively connected with one another by way of a connecting device of which the electric conductivity is a function in magnitude and direction of the relative voltages of the said terminals of the two utilization circuits.

2. An installation according to claim 1, wherein said alternating current generator includes at least one auxiliary winding adapted to be connected in parallel with other winding means, relay means operable to connect said auxiliary winding in parallel with said winding means and having a control winding connected with one terminal thereof to one terminal of said battery and with the other terminal thereof to the output terminal of a regulator independent of the voltage at the terminals of the battery.

3. An installation according to claim 2, wherein said regulator is a manomagnetic detector responsive to the pressure of the gases on the inside of the battery.

4. An installation according to claim 1, wherein said connecting device includes a normally closed voltage relay of which the terminals are connected, respectively, to the two terminals of same polarity of the utilization circuits, and having a control winding connected across the terminals of the first utilization circuit.

5. An installation according to claim 1, wherein said connecting device includes a normally closed voltage relay of which one terminal is connected to the said terminal of same polarity of said constant-voltage utilization circuit and of which the other terminal is connected to one side of a rectifier the opposite side of which is connected to the terminal of same polarity of the variable-voltage utilization circuit, said relay having a control winding connected between ground and the terminal of same polarity of the constant-voltage utilization circuit.

6. An installation according to claim 1, wherein said connecting device includes two diodes and a voltage relay with three terminals, the terminal of the movable contact of said relay being connected to the terminal of same polarity of said constant-voltage utilization circuit, the terminal of one of the fixed contacts of said relay being connected to the cathode of one diode and the terminal of the other fixed contact being connected to the anode of the other diode, the anode of said one diode and the cathode of said other diode being connected to the terminal of same polarity of said variable-voltage utilization circuit, and said relay having a control winding connected between ground and the terminal of same polarity of said constant-voltage utilization circuit.

7. An installation according to claim 1, wherein said connecting device comprises two parallel branches, one of said branches including at least one diode, of which the conducting sense is directed from the variable-voltage utilization circuit toward the constant-voltage utilization circuit, the other branch including a diode whose cathode is connected to the terminal of same polarity of the variable-voltage utilization circuit and whose anode is connected to the collector of a transistor, the emitter of said transistor being connected by way of a resistance to the terminal of same polarity of said constant-voltage utilization circuit and the base of said transistor being connected to one side of a Zener diode whose other side is grounded.

8. An installation according to claim 1, wherein said connecting device is constituted by a resistance connected, on the one hand, to the terminal of same polarity of said constant-voltage utilization circuit and, on the other, to one side of a rectifier constituted by at least one diode whose other side is connected to the terminal of same polarity of said variable-voltage utilization circuit.

9. An electric direct current generating installation, comprising
chargeable battery means with battery terminals,
first generator means operable to produce a variable-voltage current,
second generator means,
two sets of output terminal means, a first load circuit being operatively connected to a first set of output terminal means and to the battery terminals and a second load circuit with substantially constant predetermined voltage being operatively connected to the second set of said output terminal means,
first connecting means operatively connecting said first generator means to said first set of output terminal means,
second connecting means including voltage regulator means operatively connecting said second generator means to said second set of output terminal means,
and further connecting means operatively connecting with each other the two output terminal means of the same polarity of the two load circuits including means for determining the electric conductivity as regards magnitude and direction in response to the relative voltages of said two output terminal means.

10. An electric direct current generating installation, comprising
chargeable battery means with battery terminals,
first alternating-current generator means operable to produce a variable-voltage current,
second direct-current generator means,
two sets of output terminal means, a first variable-voltage load circuit being operatively connected to a first set of output terminal means and to the battery terminals and a second load circuit with substantially constant predetermined voltage being operatively connected to the second set of said output terminal means,
first connecting means including rectifier means operatively connecting said first alternating-current generator means to said first set of output terminal means,
second connecting means including voltage regulator means operatively connecting said second direct-current generator means to said second set of output terminal means,
and further connecting means operatively connecting with each other the two output terminal means of the same polarity of the two load circuits including means for determining the electric conductivity as regards magnitude and direction in response to the relative voltages of said two output terminal means.

11. An electric direct current generating system, comprising
chargeable battery means,
first generator means operatively connected with said chargeable battery means for charging the latter,
first load circuit means connected across said battery means,
second generator means,
second substantially constant load circuit means independent of said first load circuit means,
means operatively connecting said second load circuit means with said second generator means to supply said second load circuit means with a substantially constant voltage while said second generator means is operating,
and further connecting means operatively interconnecting said load circuit means with each other including means responsive to the relative voltage between said first and second load circuit means to provide an electrical connection from said first to said second load circuit means only with the voltage across said second load circuit means below a predetermined value and with the voltage across said first load circuit means above a predetermined value.

12. An electric direct current generating system, comprising
chargeable battery means,
first generator means operable to produce a variable voltage and operatively connected with said chargeable battery means for charging the latter,
means responsive to the gaseous discharge in said battery means for selectively varying the variable voltage of said first generator means,
first load circuit means connected across said battery means,
second generator means,
second substantially constant load circuit means independent of said first load circuit means,
means including voltage regulator means operatively connecting said second load circuit means with said second generator means to supply said second load circuit means with a substantially constant voltage while said second generator means is operating,
and further connecting means operatively interconnecting said load circuit means with each other including means responsive to the relative voltage between said first and second load circuit means to provide an electrical connection from said first to said second load circuit means only with the voltage across said second load circuit means below a predetermined value and with the voltage across said first load circuit means above a predetermined value and to provide an electrical connection from said second load circuit means to said first load circuit means only with the voltage across the former exceeding the voltage across the latter.

13. An electric direct current generating system, comprising
chargeable battery means,
first generator means operable to produce a variable voltage and operatively connected with said chargeable battery means for charging the latter,
means responsive to the gaseous discharge in said battery means for selectively varying the variable voltage of said first generator means,
first load circuit means connected across said battery means,
second generator means,
second substantially constant load circuit means independent of said first load circuit means,
means including voltage regulator means operatively connecting said second load circuit means with said second generator means to supply said second load circuit means with a substantially constant voltage while said second generator means is operating,
and further connecting means operatively interconnecting said load circuit means with each other including means responsive to the relative voltage between said first and second load circuit means to provide an electrical unidirectional connection from said first to said second load circuit means only with the voltage across said second load circuit means below a predetermined value and with the voltage across said first load circuit means above a predetermined value and to provide an electrical unidirectional connection from said second load circuit means to said first load circuit means only with the voltage across the former exceeding the voltage across the latter.

14. An electric direct current generating system, comprising
chargeable battery means,
first generator means operatively connected with said chargeable battery means for charging the latter,
first load circuit means connected across said battery means,
second generator means,
second substantially constant load circuit means independent of said first load circuit means,
means operatively connecting said second load circuit means with said second generator means to supply said second load circuit means with a substantially constant voltage while said second generator means is operating,
and further connecting means operatively interconnecting said load circuit means with each other including means responsive to the relative voltage between said first and second load circuit means to provide an electrical unidirectional connection from said first to said second load circuit means only with the voltage across said second load circuit means below a predetermined value and with the voltage across said first load circuit means above a predetermined value.

15. An electric direct current generating system according to claim 11, wherein said further connecting means includes a relay provided with control winding operatively connected across said first load circuit means and a movable contact operable to selectively open and close a circuit between said first and second load circuit means.

16. An electric direct current generating system according to claim 11, wherein said further connecting means includes a rectifier and a resistance in a series circuit interconnecting said two load circuit means.

17. An electric direct current generating system according to claim 11, wherein said further connecting means includes a relay having a control winding and a movable switch connected in a series circuit provided with a rectifier and interconnecting said two load circuit means, said control winding being operatively connected across said second load circuit means.

18. An electric direct current generating system according to claim 11, wherein said further connecting means includes a first circuit between said two load circuit means and provided with first rectifier means operable to enable the flow of current only from said first to said second load circuit means, and a second circuit in parallel with said first circuit and including in series a resistance, the emitter and collector of a transistor and second rectifier means in said circuit connected with opposite polarity in relation to said first rectifier means, the base of said transistor being operatively connected to a circuit including a Zener diode.

19. An electric direct current generating system according to claim 11, wherein said further means includes a plurality of series connected rectifiers between said first and second load circuit means of such polarity as to enable flow of current only from said first to said second load circuit means, 20. An electric direct current generating system according to claim 11, wherein said further means includes a relay having three terminals, a control winding operatively connected across said second load circuit means and a movable contact operable to selectively connect one terminal with the second or third terminal, first rectifier means of one polarity operatively connecting said second terminal with said first load circuit means, second rectifier means of opposite polarity operatively connecting the third terminal with said first load circuit means, and said one terminal being operatively connected with said second load circuit means.

References Cited by the Examiner
UNITED STATES PATENTS

| | | | |
|---|---|---|---|
| 2,425,743 | 8/1947 | Knight et al. | 320—40 |
| 2,658,155 | 11/1953 | Bales | 307—75 |
| 3,018,432 | 1/1962 | Palmer | 320—39 |

LLOYD McCOLLUM, *Primary Examiner.*